UNITED STATES PATENT OFFICE.

MICHAEL JLJINSKY, OF CREFELD, GERMANY, ASSIGNOR TO R. WEDEKIND & CO., OF UERDINGEN, GERMANY.

ALIZARIN SULFO-ACID AND PROCESS OF MAKING SAME.

No. 826,509. Specification of Letters Patent. Patented July 17, 1906.

Original application filed July 14, 1903, Serial No. 165,426. Divided and this application filed November 18, 1904. Serial No. 233,356.

*To all whom it may concern:*

Be it known that I, MICHAEL JLJINSKY, chemist, a subject of the Russian Emperor, and a resident of 7 Südstrasse, Crefeld, in the German Empire, have invented a new Alizarin Monosulfonic Acid and Production Thereof, of which the following is a specification.

In my application, Serial No. 165,426, filed July 14, 1903, I have described a process of sulfonating anthraquinon or other organic bodies, especially anthracene derivatives, in the presence of mercury, (as such or in the form of mercury compounds,) by which process the sulfur group or groups enter in other positions than by the sulfonating process only by means of sulfuric acid. I have found that by this process a new alizarin monosulfonic acid can be obtained by treating the alizarin with fuming sulfuric acid in the presence of mercury (as such or in a combined state) as may be illustrated by the following example: Twenty parts of alizarin, 0.4 parts of mercury sulfate, and one hundred parts of fuming sulfuric acid of twenty per cent. free $SO_3$ are slowly heated to about 115° centigrade and kept at this temperature so long until the product is soluble in water. The alizarin monosulfonic acid formed is different from that otherwise obtained under the same conditions without addition of mercury. While the known acid from acid solution is precipitated by common salt, the new alizarin monosulfonic acid can only be precipitated from acid solution by means of chlorid of potassium.

The new acid gives a carmine-colored potassium salt, which differs materially from the potassium salt of the known alizarin monosulfonic acid, as may be seen from the following table:

|  | Salt of known acid. | Salt of new acid. |
|---|---|---|
| Appearance. Watery solution. | Orange-yellow. Yellowish red. | Carmine. Dark red. |
| Solubility in KCl solution. | One gram is nearly insoluble in thirty cubic centimeters of solution of potassium chlorid of ten per cent., even in the heat. | One gram is immediately dissolved by heat in thirty cubic centimeters of solution of potassium chlorid with dark red color. The solution gelatinizes in cooling. |
| Behavior of the watery solution with sulfate of copper. | It is immediately separated a purple-violet precipitation. | The solution is colored purple, even in higher concentration. |

Dyeings: Wool mordanted with chromium and dyed with the new acid keeps the color better than such wool dyed with the known acid. The new alizarin monosulfonic acid is to be used as dyestuff or as material for producing other dyestuffs.

I claim as my invention—

1. The new alizarin monosulfonic acid characterized by having the sulfonic group in new position and giving a carmine-colored potassium salt dissolving with dark-red color in water and immediately in hot potassium-chlorid solution, which latter solution gelatinizes in cooling, the watery solution of this potassium salt giving with sulfate of copper a purple-colored solution even in higher concentration.

2. Process of producing the described alizarin monosulfonic acid, consisting in reacting on alizarin with fuming sulfuric acid in the presence of mercury, substantially as and for the purpose set forth.

In testimony whereof I have signed my name to this specification in the presence of two subscribing witnesses.

MICHAEL JLJINSKY.

Witnesses:
W. BRUCE WALLACE,
MARGARET WALLACE.